United States Patent

Jasso, Jr.

[11] Patent Number: 5,553,416
[45] Date of Patent: Sep. 10, 1996

[54] COVER FOR TREE INJECTOR CAPSULE AND FEEDER ASSEMBLY TUBE

[76] Inventor: Michael J. Jasso, Jr., 5329 Clintonville Rd., Clarkston, Mich. 48346

[21] Appl. No.: 408,481

[22] Filed: Mar. 22, 1995

[51] Int. Cl.⁶ .................................................. A01G 29/00
[52] U.S. Cl. ...................... 47/57.5; 47/58; 220/32; 411/910; 411/377; 248/551; 248/505
[58] Field of Search ................ 47/57.5, 58; 220/3.2; 411/910, 377, 372, 373; 70/63; 248/551, 505, 510; 211/4

[56] References Cited

U.S. PATENT DOCUMENTS

| | | |
|---|---|---|
| 1,080,460 | 12/1913 | Kleckner . |
| 1,858,875 | 5/1932 | Blumenthal ............................ 248/551 |
| 2,461,000 | 2/1949 | Packwood ............................ 248/551 |
| 2,646,460 | 7/1953 | Del Camp ............................ 248/505 |
| 2,947,111 | 8/1960 | Zobrist . |
| 4,214,505 | 7/1980 | Aimar .................................... 411/373 |
| 4,896,454 | 1/1990 | Cronenwett et al. ................... 47/57.5 |
| 4,896,784 | 1/1990 | Heath ................................... 220/3.2 |
| 4,929,137 | 5/1990 | Bossenmaier .......................... 411/910 |
| 5,046,281 | 9/1991 | Murphy ................................ 47/57.5 |
| 5,103,538 | 4/1992 | Ryder ................................... 411/372 |
| 5,112,175 | 5/1992 | Wilkening ............................ 411/377 |
| 5,249,391 | 10/1993 | Rodgers ................................ 47/57.5 |

FOREIGN PATENT DOCUMENTS 191644  9/1937  Switzerland ........................... 248/510

OTHER PUBLICATIONS

*Directions for use and application of Mauget Micro–Injection System*, J. J. Mauget Co., Inc., 2810 No. Figueroa St., Los Angeles, CA 90065, undated publication.

Primary Examiner—Henry E. Raduazo
Attorney, Agent, or Firm—Reising, Ethington, Barnard & Perry

[57] ABSTRACT

A protective cover for surrounding and protecting a container of substances for treatment of wood perennial plants, such as trees and the like, having a main body of flexible plastic material with a top and a continuous peripheral wall extending downwardly therefrom to a bottom tree contact edge to define a chamber for receiving said container. A plurality of integral securement tabs extend outward from opposing side walls of the cover so that special screws can be inserted therethrough to firmly secure the housing to the associated tree. The tabs can be reversely folded and anchored to securely cover and protect the attachment screws.

5 Claims, 1 Drawing Sheet

COVER FOR TREE INJECTOR CAPSULE AND FEEDER ASSEMBLY TUBE

FIELD OF THE INVENTION

This invention generally relates to the treatment of trees and other plant life with fungicides, insecticides, fertilizers and other materials to enhance their vitality and growth. More particularly, this invention relates to a new and improved plant injector cover to augment the successful application of such substances through a delivery system comprising an injector tube and a substance container capsule assembled thereto.

BACKGROUND OF THE INVENTION

Aspects of this invention are disclosed in Disclosure Document No. 366725 dated Dec. 12, 1994 and filed in the United States Patent and Trademark Office and hereby incorporated by reference.

Prior to the present invention a wide range of injector designs have been employed to effectively deliver insecticides, fungicides, and fertilizers to trees and other plants. Among widely used systems are those which involve a liquid feeder or injector tube that is inserted into the tree so that the tapered tip extends below the bark and provides a feed opening that communicates with the xylem of the tree. The tip of the feeder tube may extend into the heart wood for secure anchorage of the feeder tube and the associated treatment containing capsule or container to the tree.

While treatments through such systems are generally successful, they usually require the operative installation of the feeder tube and capsule assembly into the tree at the soil line; preferably into visible root flares or into the exposed trunk or stem immediately above the root flares when not visible. After the feeder tube and capsule assembly is initially mounted in the tree, a block or diaphragm in the capsule is broken to open a passage between the capsule and its feeder tube. The capsule is then turned on the stationary feeder tube from a downward "no flow" position to an upward position in which the fluid contents in the capsule flow through the assembly and enter the xylem at the injection site.

Under such conditions the capsule and feeder tube assembly are exposed to damage or destruction from many sources such as vandalism, lawn and garden equipment, vehicles including scooters, bicycles and motor bikes and other conveyances, as well as animals and adverse weather. To prevent the disturbance, destruction or misuse of such feeder tube and capsule assemblies, the present invention provides a new and improved protective cover which can be readily and securely attached to a tree and over the operating treatment assembly to conceal and protect the assembly from children, inquisitive persons and animals and to prevent the disturbance thereof. Importantly, this invention eliminates any need for human monitoring of the administration of the treatment by the feeder assembly since it is protected by the cover.

Preferably, specialized fasteners are used with the cover which require special tools to drive them into and from cover anchorage position on the root flares so that cover removal by an unauthorized person lacking such tools is difficult.

With this invention, the capsule and injector tube assembly is isolated from the natural or outside environment so that weather conditions such as rain, strong winds, foreign matter will not disturb the assembly. Furthermore, the inside walls of the cover are spaced from the capsule so that the capsule will be blocked from turning from an upwardly directed fluid agent delivery position to a downwardly directed "no flow" position.

The cover is readily adaptable to a wide range of tree sizes and can be easily installed on the varying sized root flares.

In this invention, the cover can be molded from suitable plastics materials such as polypropylene or other thermoplastic material having some flexibility and resilience, a good resistance to impacts and stress cracking. Also, such covers are generally not adversely affected by a wide range of chemicals or chemical compounds such as may be associated with fertilizers, insecticides and fungicides.

In one preferred embodiment of this invention, a shell like cover is molded into the form of an open ended container that is sized to closely accommodate a capsule and feeder tube assembly after such assembly has been properly placed into the tree to keep such assembly in its installed position.

Importantly, the preferred embodiment of the invention has attachment tabs integrally formed with the main body of the cover that extend outward from lower and opposing edge portions thereof. These tabs may be formed with openings for attachment screws that are received therethrough which when fully installed draw and maintain the cover tightly onto the contour of the root flair or the trunk. This improves sealing between the lower edge of the housing and the bark of the tree so that treatment chemicals are better confined by the cover and to make the cover more tamperproof. Additionally, a sight window with clear plastic or glass therein can be provided, preferably at the outer end of the cover to allow the technician to ascertain completion of the application of the material being fed into the tree.

These and other objects and advantages will become more apparent from the following detailed description and drawing in which:

DETAILED DESCRIPTION

Figure 1:
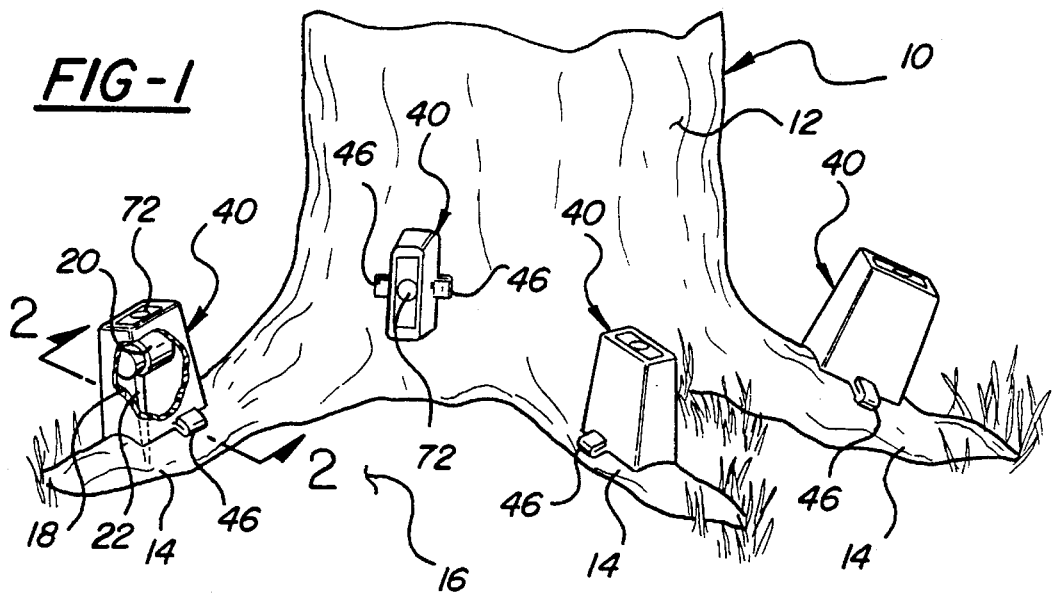
FIG. 1 is a pictorial view of the invention as applied to the root flares of a tree.

Turning now in greater detail to the drawing, there is shown in FIG. 1 portion of a tree 10 having a trunk 12 extending upwardly from root flares 14 here shown above the level of the ground 16. Mounted on each of the flares 14 is a tree injection assembly 18 comprising a capsule 20 containing a liquified insecticide, fungicide or fertilizer and a feeding tube 22. The feeding tube is mounted in small diameter bores which may be drilled or otherwise formed in root collar of the tree.

These two components of the assembly are separable from one another, the fluid conductive feeding tube 22 being formed from a tough plastic material such as Nylon. The tube 22 is an elongated and tapered pipe-like member formed with a beveled end 24 to provide an angulated material delivery opening to augment the alignment or matching of the delivery end of the tube with the xylem 25 so that the tree will be effectively treated by flow of the chemical agent in the capsule to the stems, leaves and other parts of the tree.

The feeding tube extends upwardly from its outer tip 28, here in the supporting heart wood 30 of the tree, to a shouldered connector end 32. In usual practice, the connector end 32 is cylindrical in form so that it can be inserted into a mating outlet end 34 of a passage 36 formed in the lower end of the capsule 20 to break a blocker or membrane, not shown, therein so that the liquid material in the capsule 20 can flow therefrom into the feeder tube and therethrough into the xylem 25 of the tree. Such flow and feeding takes place when the capsule is turned on cylindrical connector end 32 to the upwardly inclined feed position shown in FIG. 1.

Ordinarily the feeding tube extends from one end of the capsule 20 into the xylem and heart wood 30 of the tree 10 and supports the capsule 20 in an initially turned and downwardly inclined position. In this position, the liquid in the capsule is downstream of outlet passage 36 and thus cannot flow through the feeder tube 22 into the xylem. When administration is desired, the capsule is rotated 180 degrees on the connector end 32 of the tube to the position of FIGS. 1 and 3 so that the capsule is inclined upward and the liquid material covers and flows out of the outlet passage 36 in the bottom of the capsule and through the feeding tube and into the xylem.

This invention importantly features a cover or housing 40 which is adapted to closely fit over the capsule and feed tube assembly 18 to assure that the feeding of the tree is safely accomplished over a time period. In view of the fact that feeding of the liquid agent may take anywhere from a few hours to several days for a complete dosage to be delivered, it is important and efficient that the cover provide adequate safety and protection without human observation over the full time period of delivery.

Figure 2:
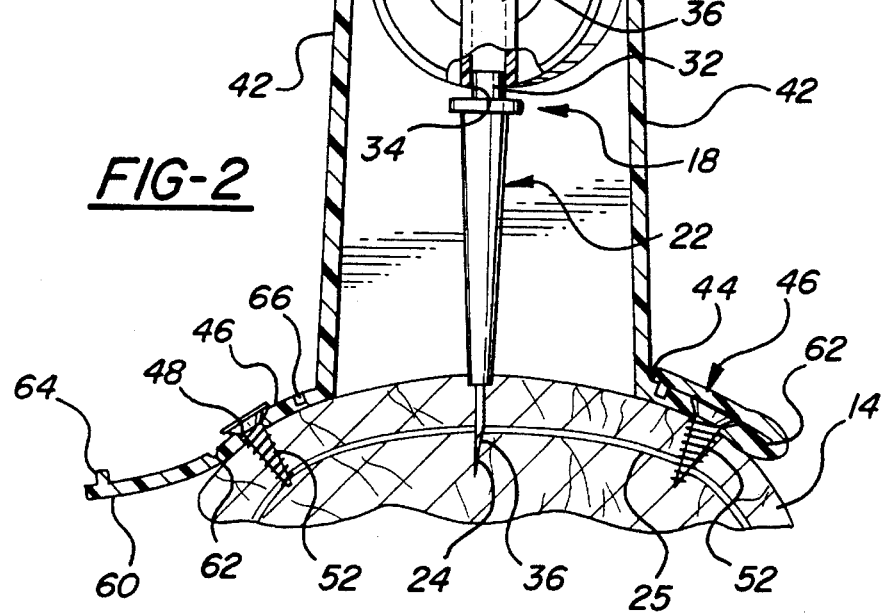
FIG. 2 is a cross sectional view taken generally along sight lines 2—2 of FIG. 1 with some parts being shown in full lines.

The cover 40, as shown in FIGS. 1 and 2, is comprised of a cup-like member which can be readily molded from polypropylene or other suitable plastics material that has high impact resistance and which provides secure protection for the injector assembly mounted low on the tree and preferably at the root flares. In such mounting positions, the covers protect the otherwise exposed feeding assemblies which could be disturbed and knocked off by lawn equipment, vehicles, vandals, or even inadvertently by animals or by children.

The housing 40 is defined by peripheral side walls 42 of a thickness to provide impact and tampering resistance and protection. The lower bottom portions of opposite side walls are formed with integral elongated tabs 46 which extend outwardly from the opposite sides thereof and which have fastener openings 48 formed therein.

Figure 3:
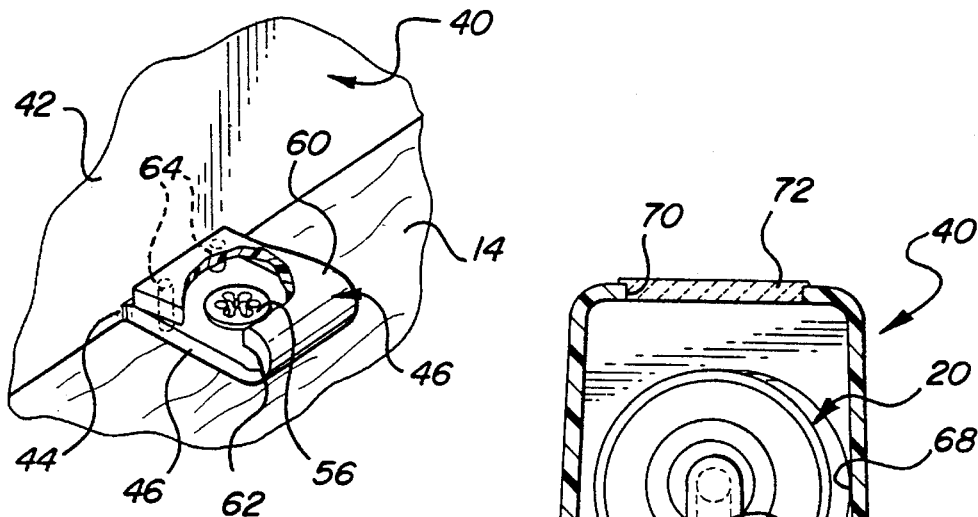
FIG. 3 is a pictorial view of a fragment of the cover of FIGS. 1 and 2.

As shown in FIG. 3, the installer can place the cover over the capsule and tube assembly 18 and advance the threaded fasteners 52 by a special bit screwdriver or other tooling until the cover is installed tightly on the root flare. The flexibility of the housing is such that it generally conforms to the curvature of the root flare. Preferably, the driver opening 56 in the threaded fastener has a special configuration that only special tooling will fit. This effectively prevents persons from using common tooling to remove the housing from the tree.

Furthermore, the tabs 46 are elongated, as best shown in FIGS. 2 and 3, so that a top fold 60 is provided to reversely bend at line or indentation 62 and fold over the top anchored portion of the tab and hide and protect the threaded fastener 52. The outboard end of these tabs is formed with integral upwardly extending and headed fastener prongs 64 which, when folded over, are received and tightly secured in mating recesses 66 within the anchored portion of the tabs adjacent to the side walls thereof.

Accordingly, with this invention the feeder tube and capsule assembly is protected from the elements such as rain and hail to assure that weather does not adversely affect the feeding of the tree. The polypropylene is a high impact resistant material but which has flexibility so that it conforms to the tree and does not normally leave gaps for pry tools to be used to force the covers from the root flares.

With this invention, the capsules are protected and maintained in their upwardly extending position so that they cannot inadvertently turn so that the flow of fluid is always maintained. For example, the capsule 20 in FIG. 3 has slightly turned such as by jarring or by gravity on the pivot provided by the connector end 32 of its feeder tube. However, the restriction provided by contact point 68 of the interior wall of the capsule prevents further turning of the capsule so that the "no flow" position cannot be obtained. Capsule turning in an opposite direction will be limited by contact 68' of the opposite interior wall of the capsule.

The top of the housing is provided with a window 70 in which a pane 72 of clear plastic or glass is affixed by suitable adhesive or other suitable fastening provision. A technician, by observing the capsule through the optic 72 can visually determine that delivery has been completed without disturbing the cover. The housing can be translucent so that additional light is transmitted therethrough to augment capsule observation if desired.

The invention has been described in an illustrative manner with respect to presently preferred embodiments, and it is to be understood that the terminology that has been used is intended to be in the nature of words of description rather than words of limitation. Obviously, many modifications and variations of the present invention in light of the above teachings may be made. It is therefore to be understood that within the scope of the appended claims, the invention may be practiced otherwise than as specifically shown and described.

What is claimed is:

1. A protective cover for surrounding and protecting a container of liquid materials for treatment of perennial plants such as trees and the like comprising a main body of flexible plastic material having a top and a peripheral wall extending downwardly from said top to a bottom edge to define a chamber for receiving said container and a plurality of securement tabs extending outward from said side walls so that tree attachment devices can be inserted therethrough to firmly secure the housing to the associated tree, a cover for each of said tabs to securely cover and protect each of said attachment devices.

2. A protective cover for a capsule assembly for injecting trees with fertilizers, insecticides and fungicides comprising a continuous wall defining a cup-shaped member which extends upwardly from a bottom peripheral edge to an upper portion, tab members extending from opposite sides of said walls of said housing, openings formed in said tabs for receiving threaded fasteners therein which can be advanced to draw the housing down onto the peripheral surface of said tree and to conform to the curvature thereof, an opening defining a window in the upper end thereof to provide a sighting aperture for observing the capsule from the exterior thereof and an optical pane secured in said window.

3. The cover of claim 2 which is defined by opposing sides that engage said capsule in response to the rotation thereof to prevent said capsule from rotating on the feeder tube from a feed position into a feed cutoff position.

4. The cover of claim 2 wherein said tabs are integral with said sides extend beyond said threaded fasteners to an extent allowing said tabs to be folded back on themselves.

5. A method of treating trees with a liquid agent comprising the steps of:

(1) forming an opening in the root collar of the tree that extends to the xylem thereof, (2) inserting an agent feeding tube into the opening so that it firmly anchors in the tree and extends generally radially from the xylem thereof to a terminal end spaced outward of said tree, (3) mounting a capsule containing the liquid agent on the terminal end of the feeding tube at an initial point so that the liquid agent is downstream of the feeding tube, (4) turning the capsule on the feeding tube to a feeding position so that the liquid agent can feed into the feeding tube, and (5) mounting a housing on the tree and over the capsule and feeding tube and fixing the housing to said tree to maintain said capsule in said feeding position and to prevent said capsule from being displaced from said feeding position.

* * * * *